United States Patent [19]
Ulanski et al.

[11] Patent Number: 5,835,351
[45] Date of Patent: Nov. 10, 1998

[54] MODULAR D.C. TOOL SWITCH ASSEMBLY

[75] Inventors: Robert M. Ulanski, Garfield Heights; Scott M. Kovach, Akron; Jan L. Michaud, Cuyahoga Falls; John J. Andrisin, III, Akron, all of Ohio

[73] Assignee: Lucerne Products, Inc., Hudson, Ohio

[21] Appl. No.: 865,669

[22] Filed: May 30, 1997

[51] Int. Cl.⁶ ................................................ H05K 7/20
[52] U.S. Cl. .................... 361/704; 361/600; 361/622; 361/704; 200/332.1; 200/332.2; 200/293.1; 174/16.3; 310/50; 310/64; 165/80.1
[58] Field of Search .................. 361/600, 622, 361/625, 704, 707, 710; 200/332.1, 332.2, 289, 293.1, 303; 174/16.3; 310/50, 64; 165/80.1

[56] References Cited

U.S. PATENT DOCUMENTS 5,200,657 4/1993 Prestel ..................................... 310/50
5,428,197 6/1995 McCurry et al. ..................... 200/332.2

Primary Examiner—Leo P. Picard
Assistant Examiner—Boris L. Chervinsky
Attorney, Agent, or Firm—Renner, Kenner, Greive, Bobak, Taylor & Weber

[57] ABSTRACT

A D.C. tool switch assembly is provided with a pair of field effect transistors (FETs) maintained internally of the housing. The switch assembly is configured of a number of subassemblies maintained within the housing, including a contact subassembly having the motor and battery contacts and a pair of pivoting contacts. The field effect transistors are maintained on a second subassembly which nests within the housing and is substantially orthogonal to the contact subassembly. A post passes through the pair of FETs and is formed to engage a heat sink on each of opposite sides of the switch housing. The heat sinks are separate and distinct from each other and individually formed. Each of the heat sinks makes close contacting engagement with an associated one of the FETs. The post provides for interconnection between the FETs and the pair of heat sinks.

12 Claims, 4 Drawing Sheets

MODULAR D.C. TOOL SWITCH ASSEMBLY

TECHNICAL FIELD

The invention herein resides in the art of electrical switches. More particularly, the invention relates to a switch particularly adapted for implementation with D.C. powered electric hand tools. More specifically, the invention relates to such a switch for high power D.C. control, employing dual field effect transistors in a modularized configuration.

BACKGROUND ART

Battery powered hand tools have become increasingly popular in recent years. While the technology respecting the batteries to operate such hand tools has advanced significantly, such that the delivery of high levels of D.C. power is capable from a battery sized to be easily received by the tool, the design of switches adapted for controlling and regulating the application of such power from the battery to the associated D.C. motor has been somewhat lacking. Those skilled in the art readily appreciate that such switches must be of compact size, readily adapted for receipt by a hand-held tool, yet possess the capability of dissipating the high level of heat generated therein. Moreover, while the prior art has generally been capable of employing a single field effect transistor (FET) within a switch housing, higher power demands require dual FETs for that purpose. When dual FETs are employed to handle increased power loads, the heat generated within the switch increases to the point where the limit of the heat sinking/dissipating function of the switch is exceeded. While the prior art has taught the utilization of dual FETs, the FETs have typically been housed external to the switch itself for purposes of achieving the necessary heat dissipation.

The prior art has further typically employed switches which are configured of a single assembly comprised of interconnected discrete components, aggravating the time to manufacture or assemble the switches, and further rendering the switches unadaptable to changes in design or application. The prior art has yet to recognize that such switches can be modularized and assembled in a form a plurality of circuit boards which provide for both electrical interconnection and structural strength.

The prior art has further aggravated the size of the switches for D.C. powered hand tools by providing three separate sets of contacts—one each for power, brake, and by-pass operations. In this regard, the by-pass operation refers to bypassing the FETs for full power. The requirement of three separate pairs of contacts necessarily aggravates the size of the switch itself.

In the prior art, the heat sinks have typically been formed of metal stock, bent or otherwise shaped to meet a desired configuration. Such heat sinks have typically been of uniform thickness, failing to tailor the thickness to optimize heat dissipation. Moreover, even in systems where two FETs have been employed, they have typically been mounted upon a single heat sink wrapped about the switch housing—again failing to maximize the heat dissipation capabilities of the heat sink.

There is a need in the art for a modularized high level D.C. power switch, defined by a small envelope, which employs a pair of FETs within the switch housing, each FET having it own heat sink configured to optimize thermal transfer from the FET to the ambient.

DISCLOSURE OF INVENTION

In light of the foregoing, it is a first aspect of the invention to provide a modular D.C. tool switch assembly which allows for the implementation of a pair of FETs internal to the switch housing.

Another aspect of the invention is the provision of a modular D.C. tool switch assembly in which two pairs of contacts are employed for achieving the power, brake and by-pass functions, reducing the effective size of the switch.

Another aspect of the invention is to provide a modular D.C. tool switch assembly consisting of a number of subassemblies appropriately fitted into the housing.

A further aspect of the invention is the provision of a modular D.C. tool switch assembly in which the circuit boards of the subassembly of the switch provide both electrical interconnection and structural strength to the switch assembly.

Still a further aspect of the invention is the provision of a modular D.C. tool switch assembly which is adaptable to a broad range of implementations and electrical controls.

Yet an additional aspect of the invention is the provision of a modular D.C. tool switch assembly in which each of a pair of FETs has its own cast heat sink, the heat sink being configured to optimize heat dissipation.

Still another aspect of the invention is the provision of a modular D.C. tool switch assembly which is reliable and durable in operation, easy to construct using state of the art techniques, compact in size, and capable of handling high current loads while dissipating the heat incident thereto.

The foregoing and other aspects of the invention which will become apparent as the detailed description proceeds are achieved by a D.C. tool switch assembly, comprising: a contact subassembly; an FET subassembly; a pair of housing halves joined together to form a housing defining an envelope receiving and maintaining said contact and FET subassemblies; and a heat sink received by said housing and in heat dissipating engagement with said FET subassembly.

Other aspects of the invention which will become apparent herein are attained by a D.C. tool switch assembly, comprising: first and second housing halves interconnected to form a housing defining an envelope; a contact subassembly securedly engaging one of said pair of housing halves and maintained within said envelope; first and second FETs maintained within said envelope; and first and second heat sink plates respectively received by said first and second housing halves external to said envelope and respectively engaging said first and second FETs.

DESCRIPTION OF THE DRAWINGS

For a complete understanding of the objects, techniques and structure of the invention reference should be made to the following detailed description and accompanying drawings wherein.

BEST MODE FOR CARRYING OUT THE INVENTION

Figure 1:
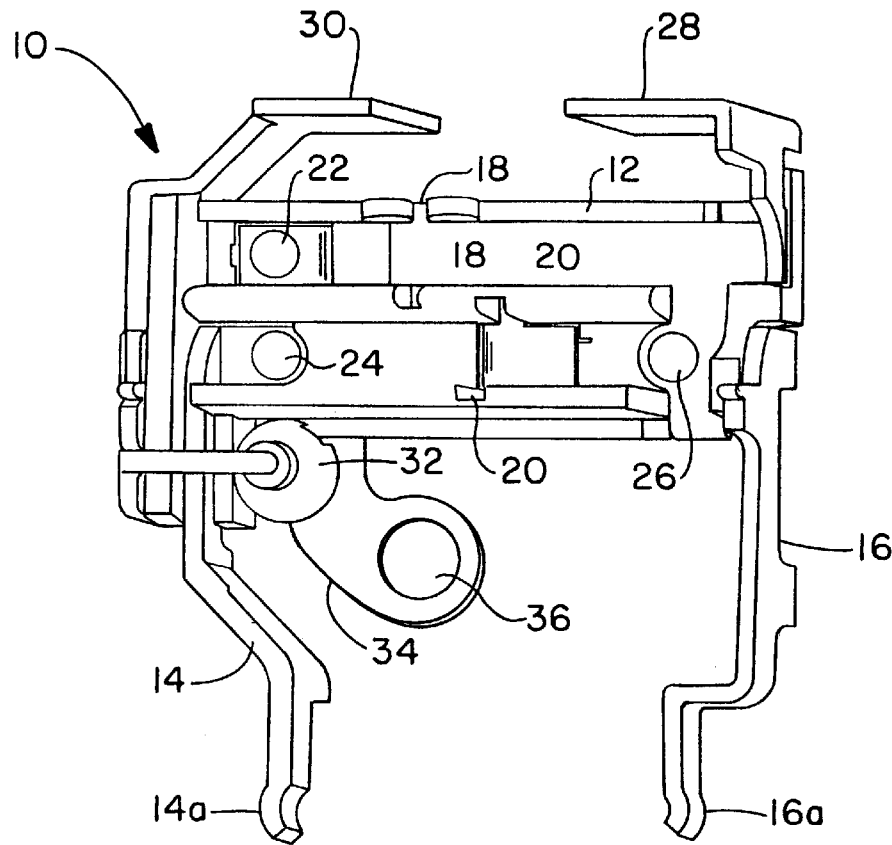
FIG. 1 is a perspective view of the contact subassembly of the invention adapted for receiving a pair of pivot contacts and adapted for being received within a switch housing.

Referring now to the drawings and more particularly FIG. 1, it can be seen that a switch contact subassembly according to the invention is designated generally by the numeral 10. The contact subassembly 10 includes an insulative frame structure 12 of plastic or other suitable material. A positive battery conductor 14 and a negative battery conductor 16 are received by the frame structure 12 and extend as legs downwards therefrom to terminate in battery contacts 14a, 16a, respectively. It will be appreciated that the battery contacts 14a, 16a may be configured to make immediate contact with a battery, interface with an adaptor for such interconnection, or be hard wired or otherwise connected thereto as will become apparent later herein.

Pairs of slots 18, 20 are provided within the frame structure 12 for purposes of receiving the axle or pivot arms of respective pairs of pivoting contacts. The slot 18 receives a pivoting contact for FET by-pass or full power operation, while the slot 20 is adapted to receive a pivoting contact which mutually exclusively provides for the application of regulated power to the motor of the associated tool or provides for brake application. In that regard, it will be appreciated that the contact 22 serves as the by-pass contact, the contact 24 serves as the power contact, and the contact 26 serves as the brake contact. With the contacts 22–26 being stationary contacts, a pivoting contact received within the slot 20 is operative between the stationary contacts 24, 26 to select either the application of power or the braking function. In similar fashion, a pivoting contact received within the slots 18 achieves FET by-pass for full power operation.

A pair of motor contacts 28, 30 extend upwardly from the insulative frame structure 12, as shown. According to the preferred embodiment of the invention, the motor contacts 28, 30 are respectively ground and power contacts. A diode 32 is crimped between the motor power contact 30 and a ground conductor 34, as shown. The ground conductor 34 is provided with an aperture 36 therein for purposes which will become apparent later herein.

Figure 2:
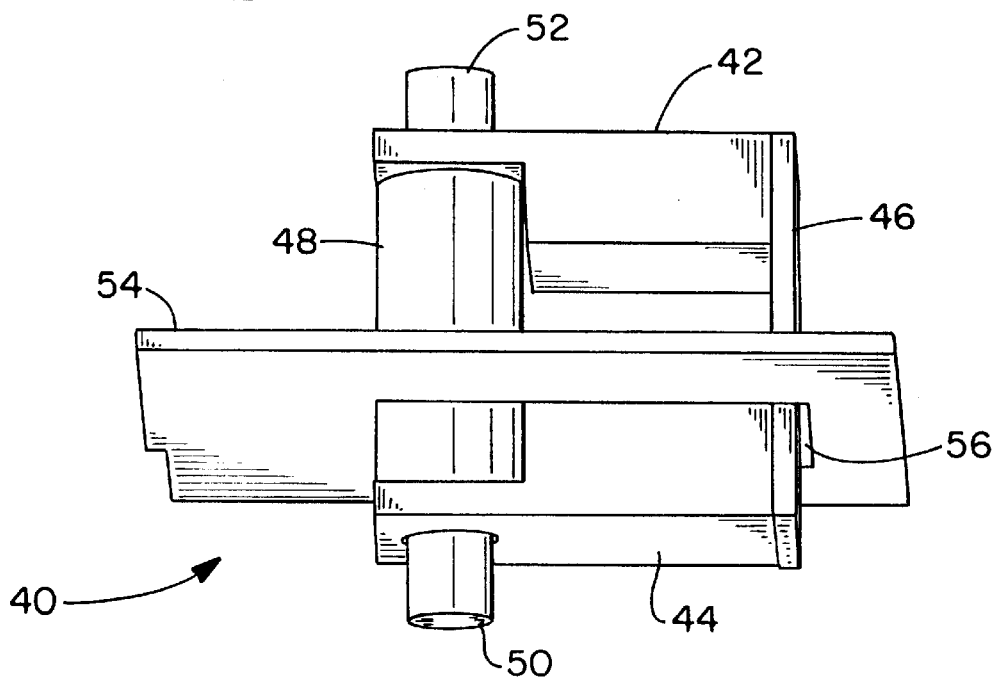
FIG. 2 is the electronic subassembly of the invention showing a pair of FETs maintained upon a circuit board and interconnected with a mounting post for securing the same to a heat sink.

With reference now to FIG. 2, it can be seen that the field effect transistor (FET) subassembly of the invention is designated generally by the numeral 40. The subassembly 40 includes a pair of FETs 42, 44 spaced from each other and commonly mounted to a secondary printed circuit board 46. A metallic electrically conductive post 48 passes through apertures in corresponding ends of the FETs 42, 44, as shown. The post 48 is characterized by rivet heads 50, 52 of reduced diameter at opposite ends thereof. It is the rivet heads 50, 52 which extend through the apertures of the FETs 42, 44, with the larger body portion of the post 48 being in contacting engagement with the associated FETs.

Also provided as a portion of the FET subassembly 40 is a primary circuit board 54 containing appropriate control electronics thereon. The primary circuit board 54 has a window 56 therein which receives the elements 42–52, as just described. In the preferred embodiment of the invention, the window 56 is rectangular for purposes of receiving the elements 42–52.

Figure 3:
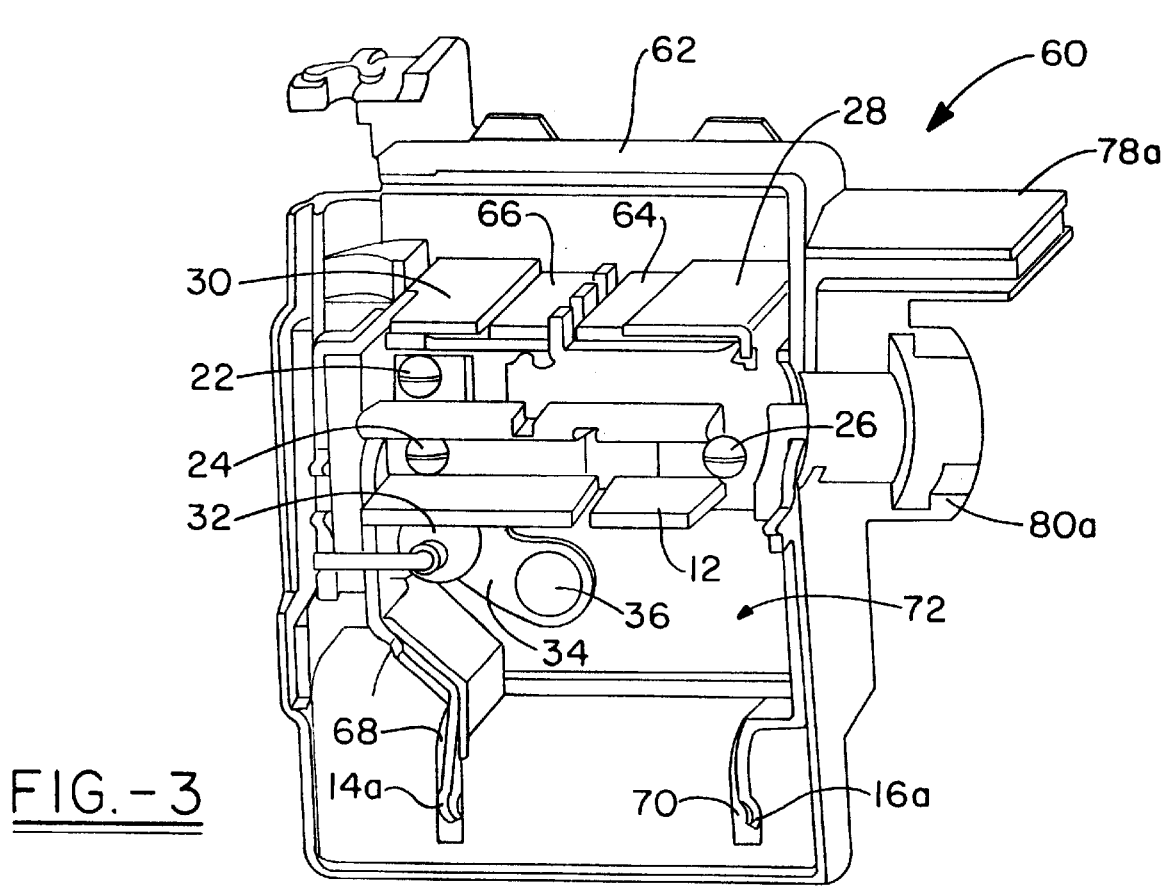
FIG. 3 is a side elevational view of a switch assembly according to the invention at a point of partial construction, showing the contact subassembly of FIG. 1 inserted in the switch housing.
Figure 4:
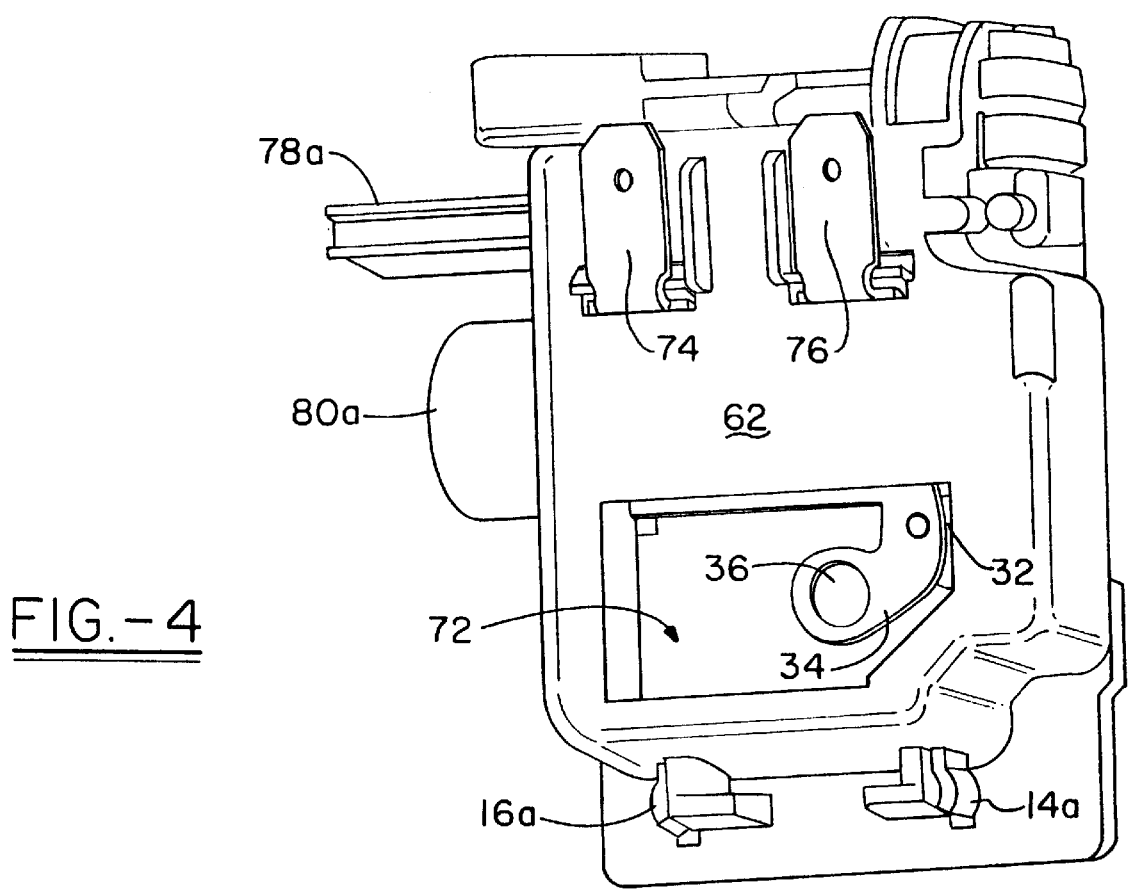
FIG. 4 is side elevational view of the assembly of FIG. 3, taken from the opposite side.

With reference now to FIG. 3, a partial assembly of the switch of the invention can be seen as designated by the numeral 60. Here, a housing half 62 receives the contact subassembly 10 in nesting engagement. As best seen in FIGS. 3 and 4, a pair of support plates 64, 66 receive the motor contacts 28, 30 and a pair of channels 68, 70 receive the leg-like battery conductors 14, 16 to achieve the desired nesting engagement. A window 72 is provided within the housing half 62 with the contact subassembly 10 received thereby. As further shown, a pair of motor connectors 74, 76 extend externally from the housing half 62, and respectively make electrical contact with the motor contacts 28, 30 of the subassembly 10. It will also be appreciated that the housing half 62 provides half of a track 78a for receiving a trigger actuator and half of a collar and bore 80a for receiving the switch actuator carried by the trigger.

Figure 5:
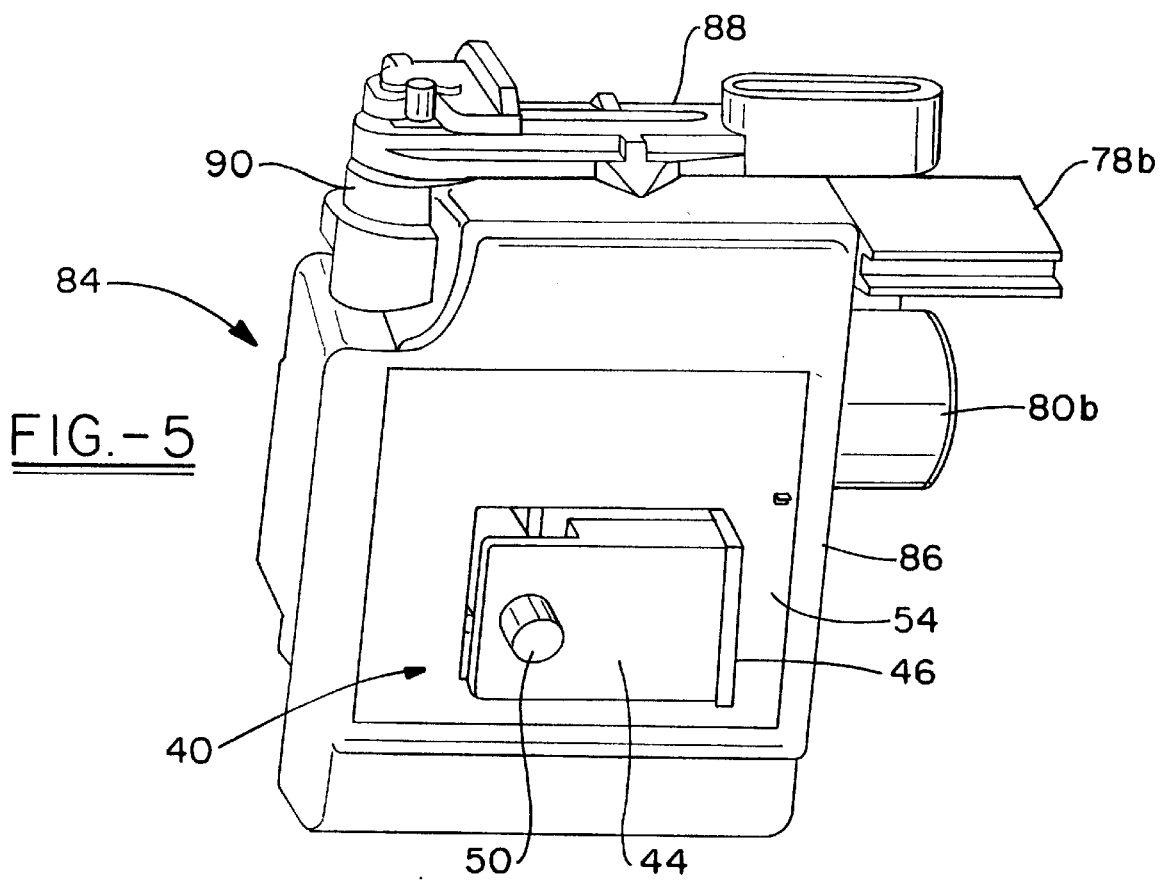
FIG. 5 is a side elevational view of the switch assembly of the invention showing the FET subassembly of FIG. 2 therein, and before application of the heat sink cover.

With reference now to FIG. 5, it can be seen that a partial assembly of the switch of the invention is designated by the numeral 84. Here, a second housing half 86 has been provided in mating snap-fit interconnection with the housing half 62 to define an interior envelope for receiving the operative subassembly of the switch. It will be seen that the housing half 86 carries a reversing switch lever 88 which in turn interconnects with the reversing switch 90, as shown. It will also be appreciated that the housing half 86 contains the other halves of trigger track 78b and the collar and bore 80b which, when respectively joined with the halves 78a, 80a carried by the housing half 62, fully define a trigger track 78 and a collar and bore 80. It will also be readily seen that the housing half 86 receives the primary circuit board 54 such that the FET subassembly 40 may be received in the window defined by the switch housing of housing halves 62, 66. The window 72 accommodates such receipt.

Figure 6:
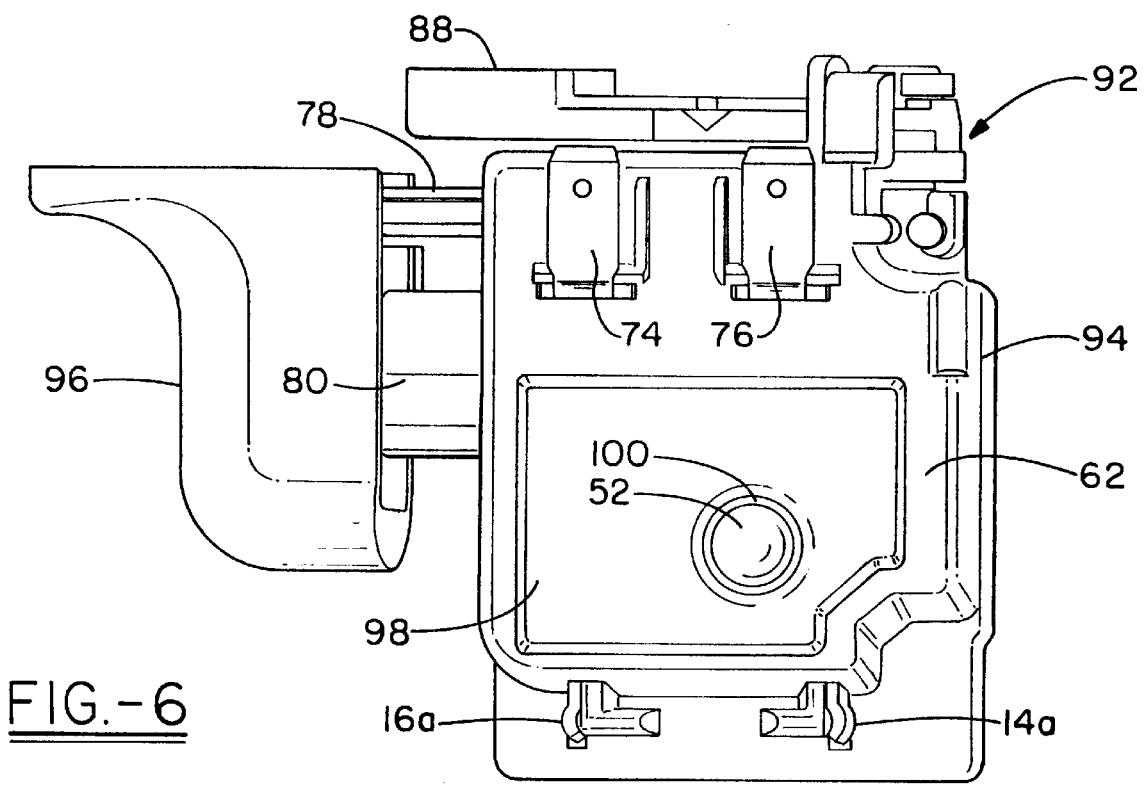
FIG. 6 is a side elevational view of the completed switch assembly according to the invention.

As shown in FIG. 6, a completed switch assembly according to the invention is designated by the numeral 92. The housing halves 62, 86 are joined together to form a closed switch housing 94 with a trigger 96 being received by the trigger track 78 and theassociated actuator being received by the collar and bore 80. A heat sink 98 is received upon the side of the housing 94 defined by the housing half 62. The heat sink 98 has a recess 100 having a bore centrally passing therethrough for receipt of the rivet head 52 of the post 48. The rivet head 52 is rolled or peened such that the heat sink 98 makes secure contacting engagement with the FET 42 to assure effective heat transfer therebetween. It will be appreciated that the heat sink 98 is preferably of cast metal, such that it can have any desired geometric configuration. Moreover, in a preferred embodiment of the invention, the heat sink 98 may crowned or otherwise thickened in the region of contact with the associated FET to optimize heat transfer and dissipation. The invention contemplates that the back side of the heat sink 98 would be flat for contacting engagement with the housing half 62 and FET 42, while the outer surface thereof would be arcuate or crowned, tapered at the edges and thicker at the center for optimized heat transfer.

As further shown in FIG. 6, the battery contacts 14a, 16a extend from the housing half 62 and may be either directly connected to a battery, hard wired to a battery, or interconnected with an appropriate adapter to achieve such interconnection.

Figure 7:
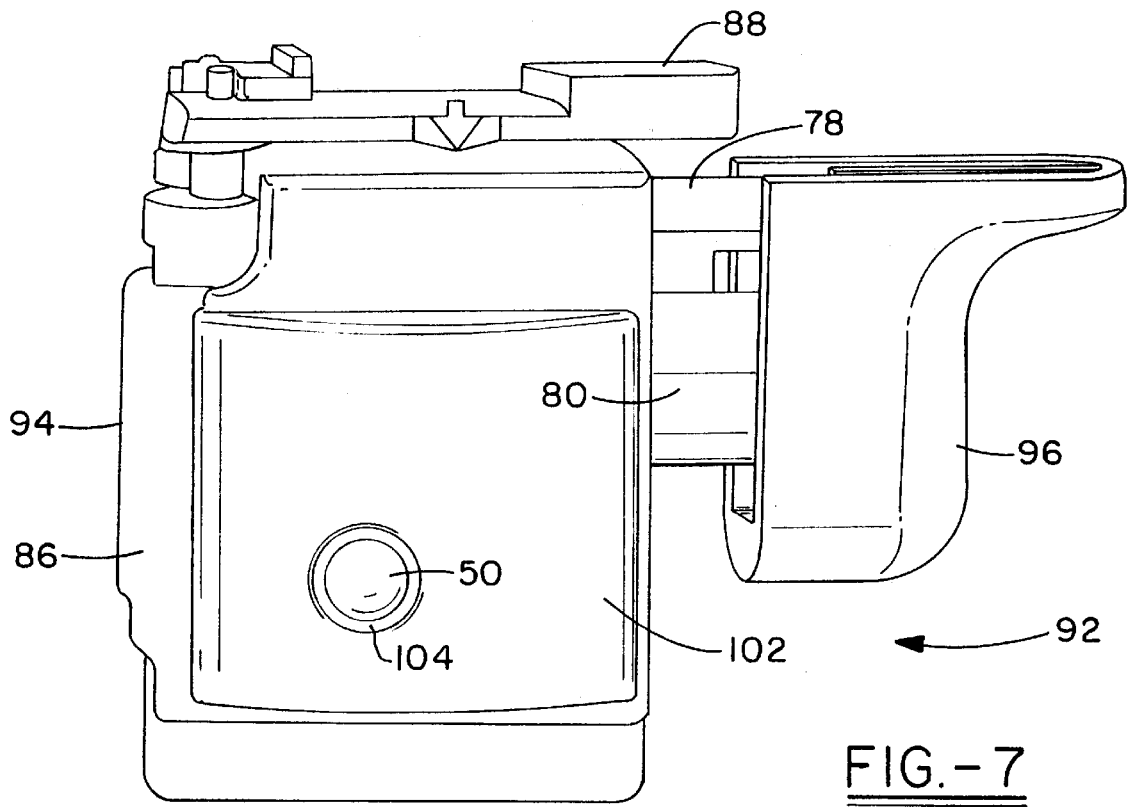
FIG. 7 is an opposite side elevational view of the switch assembly of FIG. 6.

With reference now to FIG. 7, it can be seen that the housing half 86 receives a heat sink 102 which is secured thereto and in thermal contacting engagement with the associated FET 44 by means of the rolled or peened rivet head 50 within the recess 104. It will be particularly noted that the heat sink 102 is physically of a larger size than the heat sink 98, particularly since the heat sink 98 is necessarily configured to avoid battery contacts 14a, 16a and motor contacts 74, 76. The heat sink 102 is preferably of cast metal and, as shown in FIG. 7, is generally arcuate in nature, having a greater mass in the area of contact with the associated FET and tapered toward the sides thereto to optimize heat transfer and cooling.

Figure 8A:
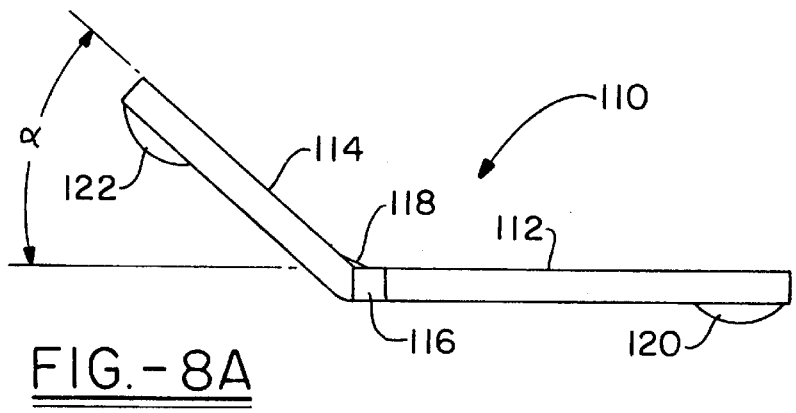
FIG. 8A is a front elevational view of a sliding contact according to the invention.
Figure 8B:
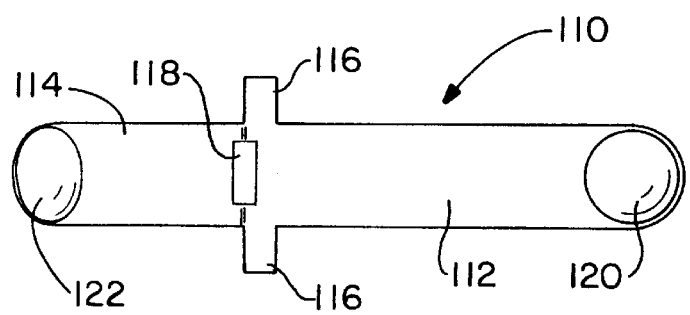
FIG. 8B is a top plan view of the slide contact of FIG. 8A.

As discussed above, the contact subassembly 10 is provided with slots 18, 20 for receiving pivoting contacts. An appropriate pivoting contact is shown is FIGS. 8A and 8B. As shown there, the pivoting contact 110 is preferably made of copper or other suitable conductive material and includes a base 112 which is bent upwardly to form a leg 114. The angle of elevation of the leg 114 is typically on the order of 40°–45°. A pair of arms or an axle 116 extends orthogonally from the base 112 at the point of departure of the leg 114. The axle or arms 116 are received in the appropriate pair of slots 18, 20 of the contact subassembly 10 as shown in FIG. 1. The arms or axle 116 provide the pivot for the pivoting contact 110.

A gusset 118 may be provided at the bend between the base 112 and leg 114, if desired. A pair of contacts 120, 122 are provided at respective ends of the base 112 and leg 114. The contacts 120, 122 are of an appropriate conductive material such as a silver/nickel alloy, or the like.

Thus it can be seen that the objects of the invention are satisfied by the structure presented hereinabove. While in accordance with the patent statutes only the best mode and preferred embodiment of the invention has been presented and described in detail, it is to be understood that the invention is not limited thereto or thereby. Accordingly, for an appreciation of the true scope and breadth of the invention reference should be made to the following claims.

What is claimed is:

1. A D.C. tool switch assembly, comprising:

a contact subassembly;

an FET subassembly;

a pair of housing halves joined together to form a housing defining an envelope receiving and maintaining said contact and FET subassemblies;

a heat sink received by said housing and in heat dissipating engagement with said FET subassembly; and wherein said FET subassembly comprises first and second FETs, both of said FETs being maintained within said housing, said FETs being mounted on a printed circuit board and interconnected by a metallic post, and wherein said heat sink comprises first and second metallic plates, one on each of said housing halves.

2. The D.C. tool switch according to claim 1, wherein said metallic post has a pair of rivet heads on opposite ends thereof.

3. The D.C. tool switch according to claim 2, wherein said first and second metallic plates are respectively secured to said first and second FETs by said rivet heads on respective ends of said metallic posts.

4. The D.C. tool switch according to claim 3, wherein said contact subassembly comprises a ground conductor having an aperture therein receiving said post.

5. The D.C. tool switch according to claim 3, wherein each of said metallic plates is of a nonuniform thickness, being rounded on an outer surface in a region nearest its associated FET.

6. The D.C. tool switch according to claim 5, wherein said metallic plates are of different sizes and are interconnected by said post.

7. The D.C. tool switch according to claim 1, wherein said contact subassembly is adapted to receive a pair of pivoting contacts.

8. The D.C. tool switch according to claim 7, wherein said contact subassembly further comprises a power contact, a brake contact and a by-pass contact, a first of said pivoting contacts reciprocatingly interposed between said power and brake contacts.

9. The D.C. tool switch according to claim 8, wherein said contact subassembly further comprises an insulative frame structure receiving a pair of battery contacts and a pair of motor contacts.

10. The D.C. tool switch according to claim 9, wherein said battery contacts and motor contacts engage one of said housing halves and secure said contact subassembly therein.

11. The D.C. tool switch according to claim 7, wherein said pivoting contacts comprise a base having a leg angled therefrom, and an axle extending orthogonally from said base at a point of joinder with said leg.

12. A D.C. tool switch assembly, comprising:

first and second halves interconnected to form a housing defining an envelop;

a contact subassembly securedly engaging one of said pair of housing halves and maintained within said envelop;

first and second FETs maintained within said envelop;

first and second heat sink plates respectively received by said first and second housing halves external to said envelop and respectively engaging said first and second FETs a post interconnecting said first and second FETs and said first and second heat sinks, said post having first and second rivet heads at each end thereof, said rivet heads engaging respective ones of said first and second heat sinks; and wherein said heat sinks comprise cast plates, said cast plates being of non-uniform thickness and being rounded on an outer surface in regions nearest the associated FET.

* * * * *